United States Patent [19]

Mosca

[11] 4,007,328
[45] Feb. 8, 1977

[54] VIDEOTELEPHONE SYSTEM WITH ANTI-CROSSTALK MEANS

[75] Inventor: Virgilio Mosca, Milan, Italy

[73] Assignee: Societa Italiana Telecomunicazioni Siemens S.p.A., Milan, Italy

[22] Filed: Sept. 30, 1974

[21] Appl. No.: 510,757

[30] Foreign Application Priority Data

Oct. 2, 1973 Italy .................................. 29619/73

[52] U.S. Cl. .............................. 358/85; 179/2 TV; 358/148; 358/149
[51] Int. Cl.$^2$ .......................................... H04N 5/04
[58] Field of Search ................... 325/20; 179/2 TV; 178/69.5 TV, 69.5 DC, 6.8

[56] References Cited

UNITED STATES PATENTS

| | | | |
|---|---|---|---|
| 2,206,654 | 7/1940 | Zworykin | 178/6.8 |
| 2,757,279 | 7/1956 | Vosburgh | 325/20 |
| 3,263,027 | 7/1966 | Beltrami | 179/2 TV |
| 3,311,702 | 3/1967 | Legler | 178/69.5 TV |
| 3,723,653 | 3/1973 | Tatsuzawa | 179/2 TV |
| 3,873,771 | 3/1975 | Kleinerman et al. | 179/2 TV |

*Primary Examiner*—Benedict V. Safourek
*Assistant Examiner*—Tommy P. Chin
*Attorney, Agent, or Firm*—Karl F. Ross; Herbert Dubno

[57] ABSTRACT

The outlying stations of a videotelephone system, adapted to communicate with one another through a central office, include each a video-reception section and a video-transmission section as well as an audio section provided with telephone equipment. A sync-pulse generator in the video-transmission section, comprising a crystal-controlled oscillator working into a pair of frequency dividers, controls the line-scan and frame-scan generators thereof as well as those of a remote station to which it is connected via an outgoing video line. A local sync-pulse extractor connected to an incoming video line controls the line-scan and frame-scan generators of the associated video-reception section. A switch enables replacement of the crystal-controlled oscillator with a variable-frequency oscillator locked in step with the sync-pulse generator of the remote station by the output of the local sync-pulse extractor whereby interference phenomena due to pick-up of incoming sync pulses, in random phase relationship with the locally generated sync pulses, are eliminated. The switchover to the variable-frequency oscillator may be carried out manually or, at a called station, by a detector circuit responsive to incoming audio or video signals, preferably to ringing current; the detector circuit includes a relay which locks for the duration of the established connection under the control of a hook switch.

10 Claims, 4 Drawing Figures

VIDEOTELEPHONE SYSTEM WITH ANTI-CROSSTALK MEANS

FIELD OF THE INVENTION

My present invention relates to a videotelephone system wherein a number of stations can enter into two-way video and audio communication with one another, usually by way of a central office such as a private telephone exchange.

BACKGROUND OF THE INVENTION

As known in the art, and as also described in my copending application Ser. No. 478,282 filed June 11, 1974, the outlying stations of such a system are each equipped with a video transmitter and a video receiver in addition to the usual telephone apparatus, these instruments being linked by audio and video lines with a common central office. Each station also includes a source of synchronizing pulses which controls the sweep circuits of its own video transmitter as well as those of its own receiver temporarily connected thereto by way of the central office. The synchronizing pulses are generated by individual crystal-stabilized oscillators operating independently of one another.

Although currently available oscillators of this type have a high frequency stability, it is nevertheless virtually impossible to keep several such oscillators in step with one another for extended periods of time. A moderately expensive crystal-stabilized oscillator may hold its rated frequency with a tolerance of 30 to 50 parts per million, corresponding to a possible deviation of 0.24 to 0.4 Hz for a line frequency of 8 kHz. The transmitting section of a station in communication with another, therefore, will have its line and frame scans controlled by locally separated sync pulses originating at the remote station, the phase relationship of the two pulse trains being generally inconstant and subject to progressive change. Since a major portion of the incoming video energy is concentrated in these sync pulses, which are separated from the accompanying picture signals by an extractor in the receiving section of the station, some of the pulse energy is unavoidably transferred to the transmitting section by an interference phenomenon which may be termed cross-vision, analogous to cross-talk, between the incoming and outgoing video lines. The randomly occurring interference pulses in the transmission section superimpose themselves on the outgoing video signals and, at the remote station, give rise to a vertical streak or bar on the screen of the television receiver, this streak traveling more or less slowly across the screen in one or the other direction according to the sense of the progressive relative phase shift between the two trains of sync pulses; with the tolerances referred to above, the streak may pass across the screen once every 2.5 to 4 seconds on the average. In an analogous manner, the outgoing sync pulses from the transmitting section of the station are partly transferred to the local receiving section where they produce a similar streak; in fact, this near-end interference phenomenon is more pronounced than the disturbance at the remote station, owing to the higher energy level of the outgoing sync pulses as compared with the incoming ones.

OBJECTS OF THE INVENTION

The general object of my present invention, therefore, is to provide means in such a videotelephone system for eliminating or at least reducing the disturbing cross-vision effect discribed above.

A more particular object is to minimize the significance of minor frequency differences between the local sync-frequency generators of the several stations in such a videotelephone system, thereby allowing greater freedom in the choice of crystal-stabilized oscillators for this purpose.

SUMMARY OF THE INVENTION

In accordance with my present invention, each station of a videotelephone system of the aforedescribed type includes switchover means for operatively connecting a controllable source of synchronizing pulses at its video-transmission section to an output of a sync-pulse extractor of the associated video-reception section to lock the line-scan and frame-scan generators of its television transmitter in step with the corresponding scan generators of the associated television receiver upon establishment of communication with a remote station operating with a free-running sync-pulse source whose operating frequency, therefore, determines the sweep rates of the television transmitters and receivers of both intercommunicating stations.

As more fully described hereinafter, the sync-pulse source of each station comprises oscillator means provided with a frequency-control circuit which is deactivated in a first position of the switchover means and adjusts the operating frequency of the associated oscillator means in a second position thereof.

According to a more particular feature of my invention, the controllable oscillator means comprises a fixed-frequency oscillator (preferably of the aforementioned crystal-stabilized type) and a variable-frequency oscillator alternately connectable by the switchover means to a frequency-dividing network delivering the line-scanning and frame-scanning pulses to the sweep circuits of the local television transmitter. In the first switchover position, the frequency-dividing network is energized exclusively by the fixed-frequency oscillator whose operating frequency is unaffected by the control circuit; in the second switchover position the variable-frequency oscillator, which is permanently connected to the aforementioned control circuit, energizes that network in response to the incoming sync pulses picked up by the extractor of the receiving section. The control circuit may include a phase comparator with input connections to the extractor and to the frequency-dividing network, this comparator detecting any phase differences between either the line-scan or the frame-scan pulses of the two sections for readjusting the local variable-frequency oscillator in a compensatory manner. This adjustable local oscillator, accordingly, operates as the slave of the free-running master oscillator at the remote end.

In principle, the switchover means at any station communicating with another may be actuated manually by a user, either according to pre-established rules or by agreement between the two communicating parties. Pursuant to another feature of my invention, however, the assignment of the roles of master and slave to the local oscillators of a pair of intercommunicating stations is determined automatically according to which of these stations initiated the connection. For this purpose, I provide signal-responsive means connected at each station to the channel leading to a remote station (directly or via an exchange, as noted above) for placing the switchover means in its second position upon initiation of communication by the remote station; advantageously, the signal-responsive means is connected to an audio line of that channel to detect call-initiating signals arriving thereover. In particular, the signal-responsive means may comprise a relay responding to ringing current from the remote station and held operated, for the duration of a call, by a conventional hook switch forming part of the telephone equipment of the called station; if the ringing signal consists of intermittent bursts of alternating current, as is usually the case, the energizing circuit of the relay should include integrating means with a time constant large enough to keep the relay operated between bursts.

BRIEF DESCRIPTION OF THE DRAWING

The above and other features of my invention will now be described in detail with reference to the accompanying drawing in which.

SPECIFIC DESCRIPTION

Figure 1:
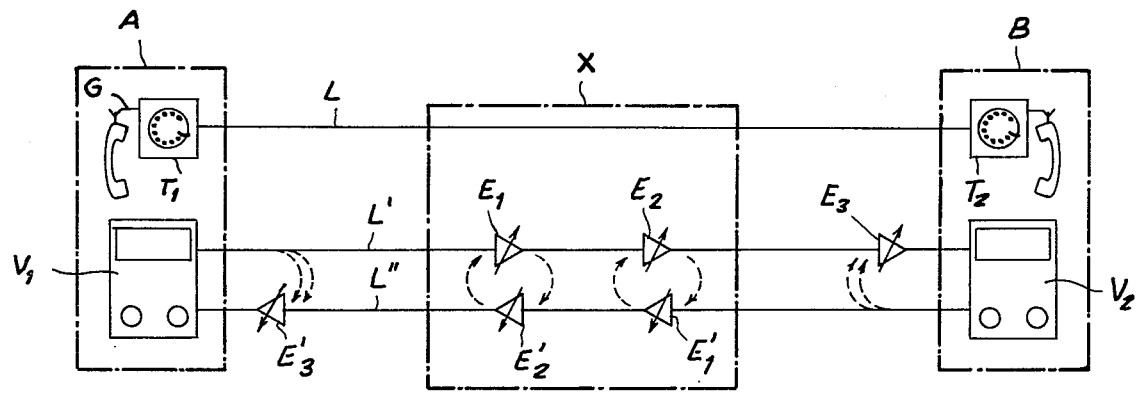
FIG. 1 diagrammatically illustrates part of a videotelephone systems, showing two outlying stations served by a common exchange.

In FIG. 1 I have shown two outlying stations A and B communicating with one another, through a conventional exchange X not illustrated in detail, via a channel including an audio line L and two video lines L' and L''. Audio line L has two conductors forming a loop (see FIG. 4) which links respective telephone apparatus $T_1$ and $T_2$ at stations A and B; video units $V_1$ and $V_2$ at these stations communicate with each other via lines L' and L'', line L' constituting the outgoing line and L'' being the incoming line as seen from station A. Line L' includes several cascaded amplifiers $E_1$, $E_2$, $E_3$, the first two being part of the exchange X whereas the last one may be considered part of station B; line L'', similarly, includes several cascaded amplifiers $E'_1$, $E'_2$, $E'_3$, the last one being considered part of station A whereas the first two are part of exchange X. The exchange may comprise a conventional cross-bar switch for the selective connection of any outlying station in the system with any other, e.g. as shown in my prior application Ser. No. 478,282.

Because of the practically unavoidable juxtaposition between the associated video lines L' and L'' within the exchange and at the outlying stations, interference phenomena of the aforedescribed cross-vision type exist by reason of energy transfer in the regions of amplifiers $E_1$, $E_2$ and $E'_1$, $E'_2$ at the exchange and especially into the inputs of terminal amplifiers $E_3$ and $E'_3$ at the outlying stations.

Figure 2:
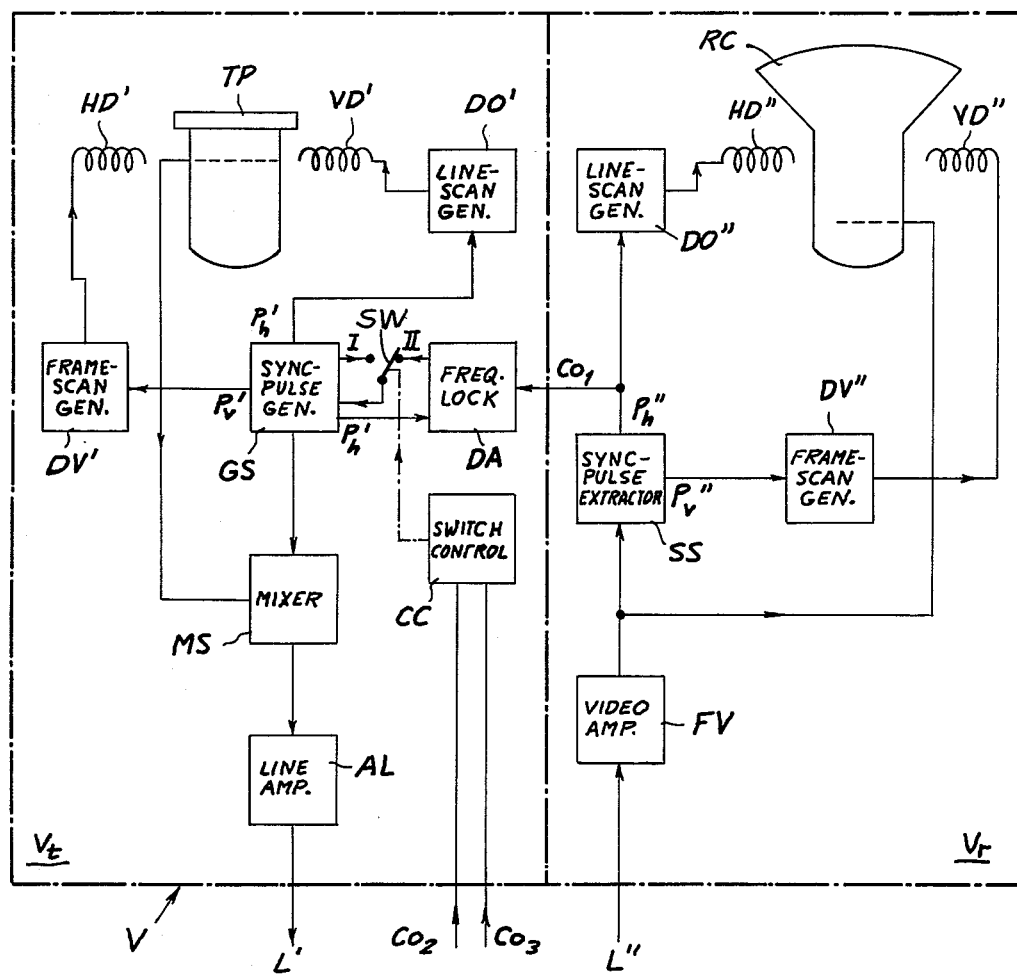
FIG. 2 is a block diagram of video equipment provided at one of the stations of FIG. 1.

As illustrated in FIG. 2 for a generic video unit V, representative of either unit $V_1$ and $V_2$ in FIG. 1, this unit is divided into a transmitting section $V_t$ and a receiving section $V_r$. Transmitting section $V_t$ comprises a camera tube TP with associated horizontal-deflection and vertical-deflection coils HD' and VD'. Similarly, the receiving section $V_r$ includes a picture tube RC with horizontal-deflection and vertical-deflection coils HD'' and VD''. Also included in section $V_t$ is a sync-pulse generator GS individual to this station, generator GS controlling energization of coils HD' and VD' through respective line-scan and frame-scan generators DO' and DV'. The output of sync-pulse generator GS is further delivered to a mixer MS also receiving video signals from a section of camera tube TP, this mixer working through a line amplifier AL into outgoing line L'.

Section $V_r$ comprises a sync-pulse extractor SS energized from line L'' through a video amplifier FV which may be part of the amplifier unit $E_3$ or $E'_3$ shown in FIG. 1, the video signals on that line going to the intensity-control grid of picture tube RC. Extractor SS controls the energization of coil VD'' through a frame-scan generator DV'' and that of coil HD'' through a line-scan generator DO''. The two pulse sources GS and SS include respective frequency-dividing networks as described hereinafter with reference to FIG. 3 for generator GS; one part of the network emits vertical-sweep pulses $P_v'$ or $P_v''$ while another part emits horizontal-sweep pulses $P_h'$ or $P_h''$ in section $V_t$ or $V_r$, respectively.

In accordance with my invention, transmitting section $V_t$ further includes a frequency-locking network DA receiving correlated pulse trains, here specifically the pulses $P_h'$ and $P_h''$, from corresponding frequency dividers of generator GS and extractor SS, the output of the latter being connected to network DA by a lead $Co_1$. A switch SW, reversible by a control unit CC, has two bank contacts engageable in alternate siwtchover positions I and II. In position I (see FIG. 3) the locking network DA is disconnected from sync-pulse generator GS which therefore operates in the free-running mode. In position II the operating frequency of that generator, and therefore the cadences of pulse trains $P_h'$ and $P_v'$, is determined by network DA which locks the sweep generators DO' and DV' of section $V_t$ in step with the corresponding generators DO'' and DV'' of section $V_r$. Control unit CC responds to call signals on line loop L, more specifically to ringing current, and to the manipulation of a hook switch of the local telephone equipment as more fully described hereinafter with reference to FIG. 4, its connections to the line L and to the telephone equipment being respectively designated $Co_2$ and $Co_3$.

Figure 3:
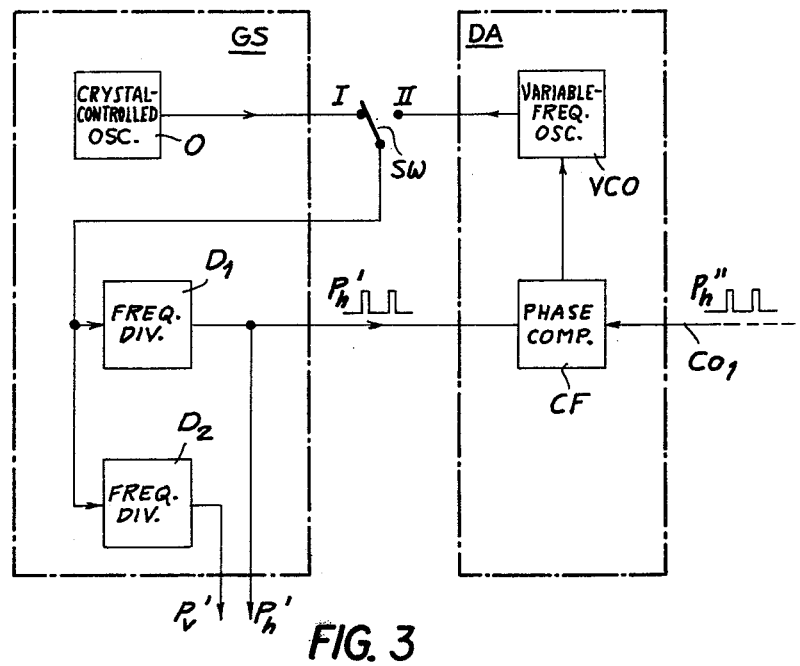
FIG. 3 is a block diagram showing details of certain components of the equipment of FIG. 2.

In FIG. 3 the sync-pulse generator GS is shown to comprise a fixed-frequency oscillator O normally connected, via switch SW in position I, to two frequency dividers $D_1$ and $D_2$ stepping down its output frequency to the cadences of line-scan and frame-scan pulses $P_h'$ and $P_v'$ respectively. Frequency-locking network DA includes a variable-frequency oscillator VCO, e.g. of the type having a varactor in its tank circuit, whose operating frequency is determined by the output voltage of a phase comparator CF receiving the pulse trains $P_h'$ and $P_h''$ from divider $D_1$ and extractor output $Co_1$, respectively. In the presence of any phase difference between these two pulse trains, comparator CF readjusts the operating frequency of oscillator VCO in a sense tending to reduce that difference so as to maintain the two pulse trains practically synchronized. This synchronization, of course, affects also the pulse trains $P_v'$ and $P_v''$ derived from the same sources, i.e. from oscillator VCO and sync-pulse extractor SS, respectively. Thus, phase comparator CF could be supplied with pulses $P_v'$ and $P_v''$ instead of pulses $P_h'$ and $P_h''$, or with any other pair of homologous pulse trains derived from these sources.

Oscillator VCO, though shown as included within network DA, may be considered as part of a controllable source of synchronizing pulses, together with oscillator O in unit GS.

Figure 4:
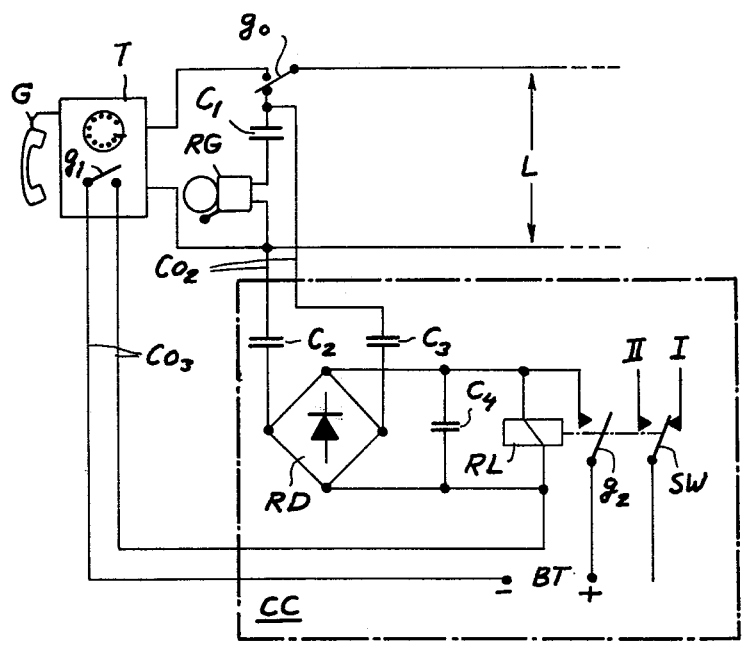
FIG. 4 is a circuit diagram of other components.

Reference will now be made to FIG. 4 for a more detailed description of the construction and operation of control unit CC. A telephone apparatus T, representative of either apparatus $T_1$ and $T_2$ in FIG. 1, has a hook switch G with contacts $g_0$ and $g_1$. Normally, i.e. when the handset of the telephone apparatus hangs on its hook to close the switch G, contact $g_0$ open-circuits the line loop L and closes a circuit for alternating current through a blocking capacitor $C_1$ and a ringer RG. Contact $g_1$, at the same time, open-circuits the connection $Co_3$ which extends from a terminal (here negative) of a direct-current source BT, shown as a battery, to the winding of an electromagnetic relay RL in unit CC. This relay winding is connected across the line shunt $C_1$, RG by way of a pair of blocking condensers $C_2$, $C_3$ and a full-wave rectifier RD in parallel with a storage capacitor $C_4$; this capacitor forms with the resistance of the relay winding an integrating network whose time constant is large enough to bridge the interval between successive bursts of ringing current arriving over the line L upon initiation of a call from a remote station.

Relay RL has two armatures, one of them being the switch SW also shown in FIGS. 2 and 3. The other armature $g_2$ connects the other (here positive) terminal of battery BT to the winding of relay RL when the latter is energized, thereby completing a holding circuit through hook-switch contact $g_1$ upon closure of the latter.

If the local user initiates an outgoing call, he first lifts the handset off its hook to reverse the contacts $g_0$ and $g_1$, thereby interrupting the energizing circuit of relay RL which therefore cannot operate in that case. Switch SW remains in position I and crystal-controlled oscillator O (FIG. 3) feeds the frequency dividers $D_1$ and $D_2$ to generate the pulses $P_h'$ and $P_v'$.

If, on the other hand, a call is initiated by a remote station, the incoming ringing current energizes the relay RL until the local user responds by lifting his handset off the hook. Now, the holding circuit for relay RL is completed and the relay remains operated until contact $g_1$ reopens upon the termination of the call. In this instance, therefore, variable-frequency oscillator VCO (FIG. 3) feeds the frequency dividers $D_1$ and $D_2$ in step with the corresponding dividers within sync-pulse extractor SS as determined by phase comparator CF.

Under these conditions, the sync pulses emitted over outgoing line L' from the local transmitting section $V_t$ coincide with those arriving over incoming line L'' at the associated receiving section $V_r$ which, in accordance with the usual practice, occur during the flyback stroke of the beam of cathode-ray tube RC so that no disturbing vertical streak appears on the screen of that tube. At the remote station, coincidence may be lacking on account of the transit time between stations which generally does not correspond to an integral number of line-sweep cycles. However, a fixed phase relationship exists at that station between the scanning pulses in its transmitting and receiving sections so that the streak will be stationary on the screen and will not shift, being thus much less distracting to the viewer. Moreover, since the output of the final amplifier FV of the receiving section $V_r$ may be easily shielded against the associated transmitting section $V_t$, the luminous intensity of that stationary streak may be kept low.

It will be apparent that signals other than ringing current, including those arriving over video line L'', may be utilized to trigger the control unit CC into reversing the switch SW in the case of an incoming call.

I claim:
 1. A videotelephone system with a plurality of stations adapted to enter into two-way communication with one another, each of said stations comprising:
  an audio section provided with telephone equipment;
  a video-transmission section including a television transmitter provided with a first frame-scan generator and a first line-scan generator;
  a video-reception section including a television receiver provided with a second frame-scan generator independent of said first frame-scan generator and a second line-scan generator independent of said first line-scan generator;
  a controllable sync-pulse source with output connections to said first line-scan and frame-scan generators and to an outgoing video line in a channel leading to a remote station temporarily communicating therewith;
  a sync-pulse extractor with input connections to an incoming line in said channel and with output connections to said second line-scan and frame-scan generators; and
  switchover means for operatively connecting said sync-pulse source to an output of said sync-pulse extractor to lock said first and second line-scan and frame-scan generators in step with one another for simultaneous transmission and reception of video signals with a common sync frequency upon establishment of communication with a remote station operating with a free-running sync-pulse source.

2. A system as defined in claim 1 wherein said sync-pulse source comprises oscillator means provided with a frequency-control circuit, said switchover meas having a first position deactivating said frequency-control circuit and a second position enabling said frequency-control circuit to adjust the operating frequency of said oscillator means.

3. A system as defined in claim 2 wherein said oscillator means comprises a fixed-frequency oscillator, a variable-frequency oscillator and frequency-dividing means alternately connectable by said switchover means to said fixed-frequency oscillator and to said variable-frequency oscillator in said first position and said second position, respectively, said variable-frequency oscillator being permanently connected to said frequency-control circuit.

4. A system as defined in claim 3 wherein said frequency-control circuit comprises a phase comparator with input connections to said sync-pulse extractor and to said frequency-dividing means.

5. A system as defined in claim 2, further comprising signal-responsive means connected to said channel for placing said switchover means in said second position upon initiation of communication by said remote station.

6. A system as defined in claim 5 wherein said signal-responsive means is connected to said telephone equipment for actuation by an incoming call signal.

7. A system as defined in claim 6 wherein said telephone equipment includes manual switch means manipulated by a user at the inception and the termination of a call, said signal-responsive means including holding means controlled by said switch means for maintaining said switchover means in said second position for the duration of an incoming call.

8. A system as defined in claim 7 wherein said channel includes a line loop connected to said telephone equipment, said holding means comprising a relay connected across said line loop in a normal position of said switch means for operation by said call signal and contacts coupled with said switch means and closed in an off-normal position thereof for keeping said relay operated.

9. A system as defined in claim 8 wherein said telephone equipment includes alarm means and a handset, said switch means being a hook switch actuated by said handset for normally disconnecting said line loop from said handset and connecting said line loop across said alarm means for monitoring call signals from a remote station, said relay having an energizing circuit connected across said alarm means.

10. A system as defined in claim 9 wherein said alarm means comprises a ringer responding to periodic bursts of alternating current, said energizing circuit including rectifying means for said alternating current and integrating means for keeping said relay energized between said bursts.

* * * * *